(12) United States Patent
Ohno (10) Patent No.: US 6,310,732 B1
(45) Date of Patent: Oct. 30, 2001

(54) SIMPLE POWER-VARIABLE FINDER

(75) Inventor: Kazunori Ohno, Omiya (JP)

(73) Assignee: Fuji Photo Optical Co., Ltd., Saitamt (JP)

( * ) Notice: Subject to any disclaimer, the term of this patent is extended or adjusted under 35 U.S.C. 154(b) by 0 days.

(21) Appl. No.: 09/528,435

(22) Filed: Mar. 17, 2000

(30) Foreign Application Priority Data

Mar. 24, 1999 (JP) .................................................. 11-078971
Jan. 17, 2000 (JP) .................................................. 12-007665

(51) Int. Cl.$^7$ .................................................. G02B 15/14
(52) U.S. Cl. .................................................. 359/689; 359/682
(58) Field of Search .................................................. 359/689, 686, 359/683, 676, 432, 422, 682

(56) References Cited

U.S. PATENT DOCUMENTS 4,854,680 * 8/1989 Kikuchi .................................................. 359/689
5,796,518 * 8/1998 Kato .................................................. 359/432

OTHER PUBLICATIONS

Japanese Patent Office, Patent Abstracts of Japan, Publication No.: 03092807A, Date of Publication: Apr. 18, 1991, Application No.: 01230158, Date of Filing: Sep. 5, 1989, pp. 41–46.

Japanese Patent Office, Patent Abstracts of Japan, Publication No.: 63221313 A, Date of Publication; Sep. 14, 1988, Application No. 62053993, Date of Filing Mar. 11, 1987, pp. 69–85.

Japanese Patent Office, Patent Abstracts of Japan, Publication No.: 61167919A, Date of Publication: Jul. 29, 1986, Application No. 60008838, Date of Filing: Jan. 21, 1985, pp. 103–109.

* cited by examiner

*Primary Examiner*—Jordan M. Schwartz
(74) *Attorney, Agent, or Firm*—Snider & Associates; Ronald R. Snider

(57) ABSTRACT

A small-size, inexpensive, simple power-variable finder comprises, successively from the object side, a negative first lens group $G_1$, a positive second lens group $G_2$, and a negative third lens group $G_3$. As the second lens group $G_2$ is moved along the optical axis X, zooming is carried out. Field masks $M_1$ to $M_3$ are disposed at predetermined positions. The finder satisfies the following conditional expressions (1) to (3):

$$-1.3 < f_2/f_1 < -1.0 \quad (1)$$
$$1.6 < f_3/f_1 < 2.2 \quad (2)$$
$$-2.4 < D_T/f_1 < -1.7 \quad (3)$$

where $f_i$ is the focal length of the i-th lens group, and $D_T$ is the distance on the optical axis between the surface closest to the object in the first lens group $G_1$ and the surface closest to an eye in the third lens group $G_3$.

10 Claims, 10 Drawing Sheets

EXAMPLE 1

FIG.2A-1
EXAMPLE 1
WIDE-ANGLE END
PUPIL HEIGHT

SPHERICAL
ABERRATION(diop)

FIG.2A-2
EXAMPLE 1
WIDE-ANGLE END

CURVATURE OF
FIELD(diop)

FIG.2A-3
EXAMPLE 1
WIDE-ANGLE END

DISTORTION(%)

FIG.2B-1
EXAMPLE 1
INTERMEDIATE VALUE
PUPIL HEIGHT

SPHERICAL
ABERRATION(diop)

FIG.2B-2
EXAMPLE 1
INTERMEDIATE VALUE

CURVATURE OF
FIELD(diop)

FIG.2B-3
EXAMPLE 1
INTERMEDIATE VALUE

DISTORTION(%)

FIG.2C-1
EXAMPLE 1
TELEPHOTO END
PUPIL HEIGHT

SPHERICAL
ABERRATION(diop)

FIG.2C-2
EXAMPLE 1
TELEPHOTO END

CURVATURE OF
FIELD(diop)

FIG.2C-3
EXAMPLE 1
TELEPHOTO END

DISTORTION(%)

FIG. 3A  WIDE-ANGLE END
FIG. 3B  TELEPHOTO END

FIG.4A-1 EXAMPLE 2 WIDE-ANGLE END PUPIL HEIGHT

FIG.4A-2 EXAMPLE 2 WIDE-ANGLE END

FIG.4A-3 EXAMPLE 2 WIDE-ANGLE END

FIG.4B-1 EXAMPLE 2 TELEPHOTO END PUPIL HEIGHT

FIG.4B-2 EXAMPLE 2 TELEPHOTO END

FIG.4B-3 EXAMPLE 2 TELEPHOTO END

FIG.5A EXAMPLE 3 WIDE-ANGLE END

FIG.5B TELEPHOTO END

FIG.6A-1
EXAMPLE 3
WIDE-ANGLE END
PUPIL HEIGHT
SPHERICAL ABERRATION (diop)

FIG.6A-2
EXAMPLE 3
WIDE-ANGLE END
ω
CURVATURE OF FIELD (diop)

FIG.6A-3
EXAMPLE 3
WIDE-ANGLE END
ω
DISTORTION (%)

FIG.6B-1
EXAMPLE 3
TELEPHOTO END
PUPIL HEIGHT
SPHERICAL ABERRATION (diop)

FIG.6B-2
EXAMPLE 3
TELEPHOTO END
ω
CURVATURE OF FIELD (diop)

FIG.6B-3
EXAMPLE 3
TELEPHOTO END
ω
DISTORTION (%)

EXAMPLE 4

FIG.7A WIDE-ANGLE END

FIG.7B TELEPHOTO END

FIG.8A-1
EXAMPLE 4
WIDE-ANGLE END
PUPIL HEIGHT

FIG.8A-2
EXAMPLE 4
WIDE-ANGLE END

FIG.8A-3
EXAMPLE 4
WIDE-ANGLE END

FIG.8B-1
EXAMPLE 4
INTERMEDIATE VALUE
PUPIL HEIGHT

FIG.8B-2
EXAMPLE 4
INTERMEDIATE VALUE

FIG.8B-3
EXAMPLE 4
INTERMEDIATE VALUE

FIG.8C-1
EXAMPLE 4
TELEPHOTO END
PUPIL HEIGHT

FIG.8C-2
EXAMPLE 4
TELEPHOTO END

FIG.8C-3
EXAMPLE 4
TELEPHOTO END

SIMPLE POWER-VARIABLE FINDER

RELATED APPLICATIONS

This application claims the priorities of Japanese Patent Application No. 11-078971 filed on Mar. 24, 1999 and Japanese Patent Application No. 2000-007665 filed on Jan. 17, 2000, which are incorporated herein by reference.

BACKGROUND OF THE INVENTION

1. Field of the Invention

The present invention relates to a power-variable finder and, in particular, to a simple power-variable finder suitable for low-cost cameras.

2. Description of the Prior Art

Recently, as low-cost cameras such as film-plus-camera boxes have come into widespread use, there has been a strong demand for finders suitable for such cameras. When a taking system is of a power-variable type, then such a finder is required to have a power-varying function for changing the field magnification while keeping a constant diopter, and it is also important for the finder to be small enough to be mounted in a narrow space and inexpensive.

An example of power-variable finders is disclosed in Japanese Unexamined Patent Publication No. 3-92807. This power-variable finder is an inverted Galilean finder having a simple configuration comprising one objective lens and two eyepieces, and is capable of varying its power by replacing the objective lens. However, it necessitates a shelter space for replaceable lens components, thus failing to save its space for reducing the dimensions of the finder. Though there have been known power-variable finders in which eyepiece systems are changed over instead of replacing objective systems, they are similarly problematic in terms of saving space.

On the other hand, Japanese Unexamined Patent Publication No. 61-167919 discloses an example of zoom type power-variable finders in which lenses of the objective system are not so large, thereby being suitable for making the finder smaller. This power-variable finder comprises, successively from the object side, a first lens group having a negative refracting power, a second lens group having a positive refracting power, and a third lens group having a negative refracting power; and reduces the fluctuation in diopter upon power variation, thereby attaining a favorable finder image. In this power-variable finder, however, a plurality of lens groups are movable groups, thereby complicating their moving mechanism and making it hard to cut down the manufacturing cost.

Japanese Unexamined Patent Publication No. 63-221313 discloses another example of zoom type power-variable finders comprising, successively from the object side, a fixed first lens group having a negative refracting power, a movable second lens group having a positive refracting power, and a fixed third lens group having a negative refracting power, in order to favorably correct chromatic aberration. In such a configuration, however, the positive second lens group comprises a plurality of lenses in order to attain a sufficient refracting power, and the lens moving mechanism is complicated since the lens spaces are changed within the second lens group so as to reduce variations in diopter while the second lens group as a whole is moved. In view of these points, it is hard to consider that this power-variable finder can be made inexpensively.

SUMMARY OF THE INVENTION

In view of such circumstances, it is an object of the present invention to provide a small-size, low-cost, simple power-variable finder having a power-varying function, which is mountable in a narrow space.

The simple power-variable finder in accordance with the present invention comprises, successively from an object side, a first lens group having a negative refracting power, a second lens group, movable on an optical axis, having a positive refracting power, and a third lens group having a negative refracting power; and satisfies the following conditional expressions (1) to (3):

$$-1.3 < f_2/f_1 < -1.0 \qquad (1)$$

$$1.6 < f_3/f_1 < 2.2 \qquad (2)$$

$$-2.4 < D_T/f_1 < -1.7 \qquad (3)$$

where $f_1$ is the focal length of the first lens group;

$f_2$ is the focal length of the second lens group;

$f_3$ is the focal length of the third lens group; and $D_T$ is the distance on the optical axis between the surface closest to the object in the first lens group and the surface closest to an eye in the third lens group.

Preferably, the first lens group is constituted by a single negative lens having at least one aspheric surface and a concave lens directed onto the eye side, the second lens group is constituted by a single biconvex lens having at least one aspheric surface, and the third lens group is constituted by a single negative lens.

Preferably, a first field stop is disposed in front of or behind the first lens group.

At least two field stops may be provided, such that the first field stop is disposed in front of or behind the first lens group, whereas the second field stop is disposed in front of or behind the second lens group.

The first field stop, displayable as a finder field frame, may be disposed in front of the first lens group.

The first field stop, made of a transparent member, may be disposed in front of the first lens group, and the transparent member may be formed with a frame displayable as a finder field frame.

The surface closest to the object in the first lens group may be made concave onto the object side.

Preferably, the negative lens constituting the first lens group, the biconvex lens constituting the second lens group, and the negative lens constituting the third lens group are made of the same material.

BRIEF DESCRIPTION OF THE DRAWINGS

FIGS. 2A-1 to 2A-3, 2B-1 to 2B-3, 2C-1 to 2C-3 are aberration charts of the simple power-variable finder in accordance with Example 1;

FIGS. 4A-1 to 4A-3 and 4B-1 to 4B-3 are aberration charts of the simple power-variable finder in accordance with Example 2;

FIGS. 6A-1 to 6A-3 and 6B-1 to 6B-3 are aberration charts of the simple power-variable finder in accordance with Example 3;

FIGS. 8A-1 to 8A-3, 8B-1 to 8B-3 and 8C-1 to 8C-3 are aberration charts of the simple-power variable finder in accordance with Example 4;

DESCRIPTION OF THE PREFERRED EMBODIMENTS

In the following, an embodiment of the present invention will be explained with reference to the accompanying drawings.

Figure 1A:
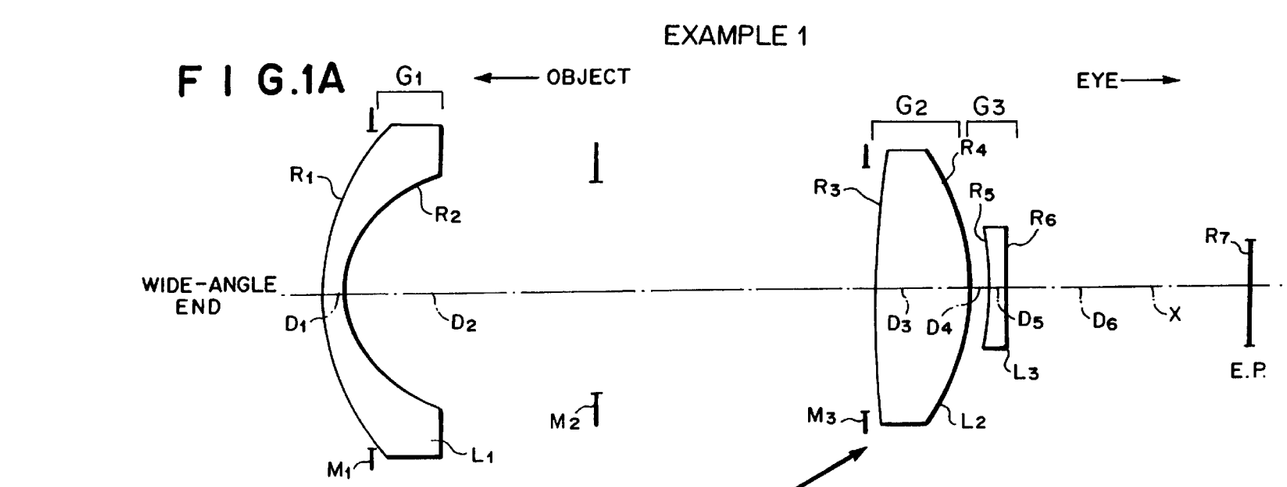
FIGS. 1A and 1B are schematic views showing a basic configuration of the simple power-variable finder in accordance with Example 1 of the present invention.
Figure 1B:
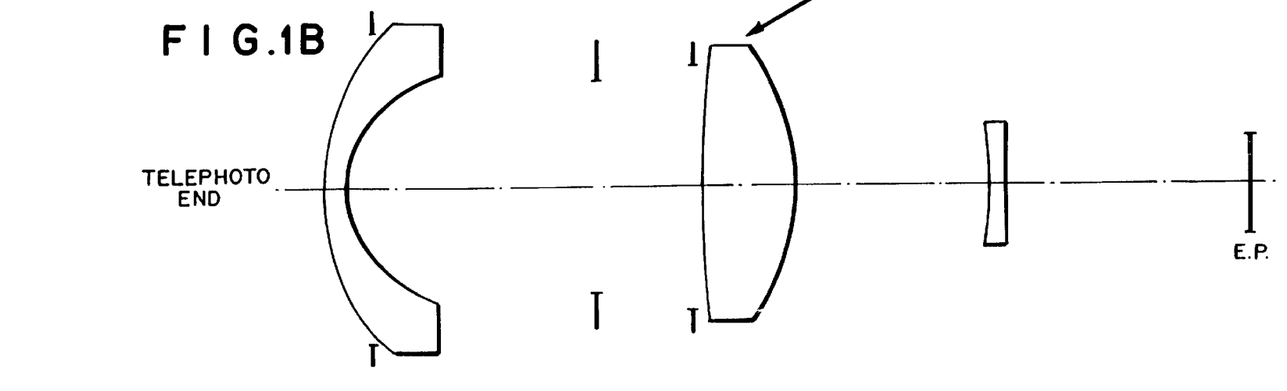

FIGS. 1A and 1B are schematic views showing the configuration of the simple power-variable finder in accordance with Example 1, which will be explained later, as a representative of the simple power-variable finder in accordance with this embodiment.

As shown in FIGS. 1A and 1B, this simple power-variable finder has a three-group, three-element configuration comprising, successively from the object side, a first lens group $G_1$ constituted by a first lens $L_1$ having a negative refracting power, a second lens group $G_2$ constituted by a second lens $L_2$ having a positive refracting power, and a third lens group $G_3$ constituted by a third lens $L_3$ having a negative refracting power, whereas all the constitutional lenses are formed from the same organic material. Here, the first lens $L_1$ is made of a lens having at least one aspheric surface and a stronger concave curvature on the eye side, whereas the second lens $L_2$ is made of a lens having at least one aspheric surface and a stronger convex curvature on the eye side.

Upon zooming, the second lens group $G_2$ moves along the optical axis X according to the locus of movement shown in FIGS. 1A and 1B, whereby the finder changes the finder magnification.

For defining the field of view, a first field stop $M_1$ is disposed on the object side of the first lens group $G_1$, whereas second and third field stops $M_1$, $M_2$ are disposed on the object side of the second lens group $G_2$, whereby a parallel luminous flux incident on the finder in parallel with the optical axis X forms an image at an eye point position E.P. Examples explained later are configured such that one to three field stops M are disposed. Operations and effects of these field stops $M_1$ to $M_3$ will be detailed in the explanation of each example mentioned later.

Also, this simple power-variable finder satisfies the following conditional expressions (1) to (3):

$$-1.3 < f_2/f_2 < -1.0 \qquad (1)$$

$$1.6 < f_3/f_1 < 2.2 \qquad (2)$$

$$2.4 < D_T/f_1 < -1.7 \qquad (3)$$

where $f_1$ is the focal length of the first lens group $G_1$;

$f_2$ is the focal length of the second lens group $G_2$;

$f_3$ is the focal length of the third lens group $G_3$; and $D_T$ is the distance on the optical axis between the surface closest to the object in the first lens group $G_1$ and the surface closest to an eye in the third lens group $G_3$.

Here, conditional expression (1) defines the ratio of the focal length of the second lens group $G_2$ to the focal length of the first lens group $G_1$. If the lower limit of conditional expression (1) is not satisfied, then the refracting power of the second lens group $G_2$ will be so weak that the whole length of the finder may increase or the front lens diameter may enhance, thereby making it harder to attain smaller dimensions. If the upper limit of conditional expression (1) is exceeded, then the refracting power of the second lens group $G_2$ will be so strong that it becomes hard to maintain finder performances.

Conditional expression (2) defines the ratio of the focal length of the third lens group $G_3$ to the focal length of the first lens group $G_1$. If the lower limit of conditional expression (2) is not satisfied, then the refracting power of the third lens group $G_3$ will be so strong that it becomes hard to maintain finder performances. If the upper limit of conditional expression (2) is exceeded, then the refracting power of the third lens group $G_3$ will be so weak that the whole length of the finder may increase or the front lens diameter may enhance, thereby making it harder to attain smaller dimensions.

Conditional expression (3) defines the ratio of the length of the whole finder system to the focal length of the first lens group $G_1$. If the lower limit of conditional expression (3) is not satisfied, then the whole length of the finder may increase or the front lens diameter may enhance, thereby making it harder to attain smaller dimensions. If the upper limit of conditional expression (3) is exceeded, then it becomes hard to maintain finder performances.

When all of these conditional expressions (1) to (3) are satisfied, then it is possible to obtain a power-variable finder with a simple configuration in which only the second lens group $G_2$ in the three groups is moved by a relatively small amount of movement along the optical axis upon power variation, and variations in diopter are small and lie within a practically unproblematic range.

Namely, this simple power-variable finder does not necessitate complicated moving mechanisms, thereby being able to cut down the cost. Also, the lens diameter of the first lens $G_1$ is so small that no shelter spaces for replaceable lens components for replacing objective systems or changing over eyepiece systems are necessary. Therefore, space can be saved, and the finder as a whole can be made smaller. Also, since it is configured such that the first lens group $G_1$ and the third lens $G_3$ are made stationary, while only the second lens group $G_2$ is movable, sand and dust are hard to enter the inside of the lens system even when no cover lens is disposed on the object side of the first lens group $G_1$ or on the eye side of the third lens group $G_3$, whereby the number of members can be cut down.

As will be seen from the following Examples, practically sufficient performances can be obtained, even if each of the lens groups $G_1$ to $G_3$ is constituted by a single lens, when the curvature and aspheric surface of each lens are utilized effectively. As the number of constituents is made as small as possible, a less expensive, smaller power-variable finder in which the whole length of the system is shorter can be obtained.

In this embodiment, all of the first lens $L_1$ to third lens $L_3$ are formed from the same organic material. When the individual lenses $L_1$ to $L_3$ are made of the same material, then a simple power-variable finder which is also favorable in terms of manufacture can be obtained. Even if the refractive index and dispersion of each lens are held constant, the configuration mentioned above can improve chromatic aberration, thereby yielding a simple power-variable finder favorable in terms of performances as well. In terms of performances, it is further preferred that the lenses be formed from a low dispersion material having an Abbe number of about 60. The organic material satisfies this condition. Also, using the organic material can cut down the cost of manufacture.

Meanwhile, one of functions of the finder is to define the field range for taking a picture. Therefore, a member for displaying a field frame, such as Albada finder or illuminated finder, has conventionally been required. However, as mentioned above, the simple power-variable finder is configured such that variations in diopter caused by changes in magnification lie within a practically unproblematic range. Therefore, if a field stop constituted by a marginal lens frame or field mask is disposed at an appropriate position, then this field stop can function as a field frame display system.

Figures 9A, 9B:
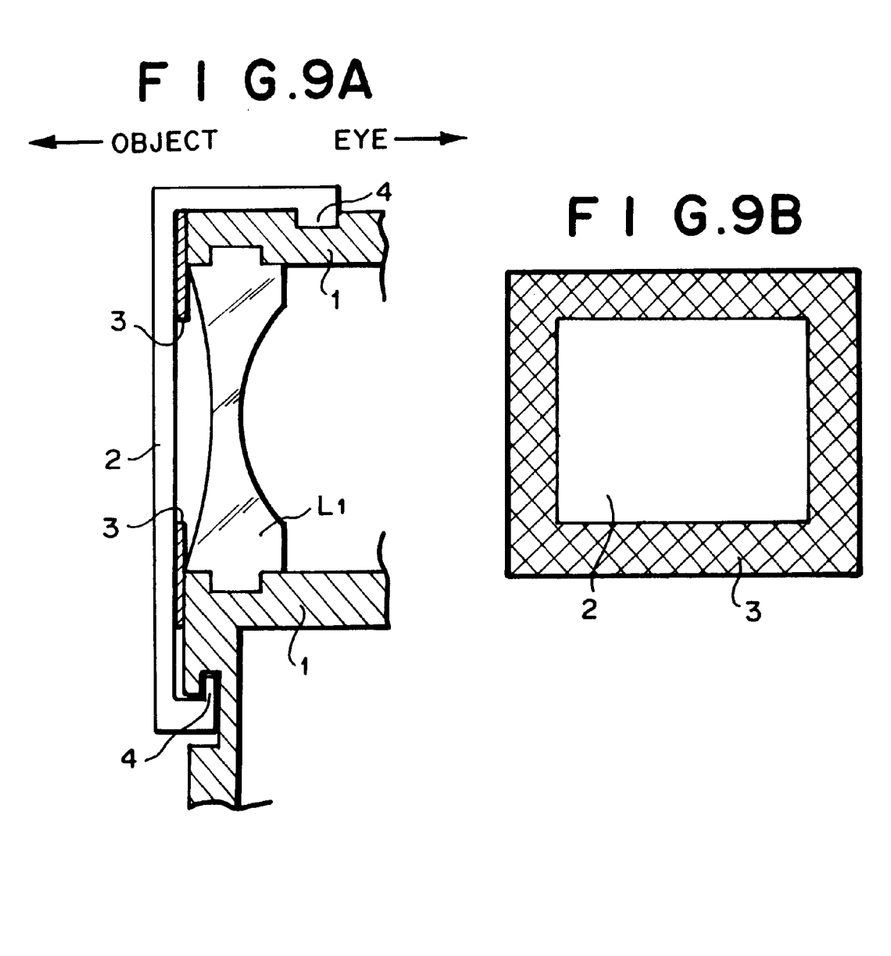
FIGS. 9A to 9C are a partial sectional view and partial side views showing examples of field frame display using a transparent member.
Figure 9C:
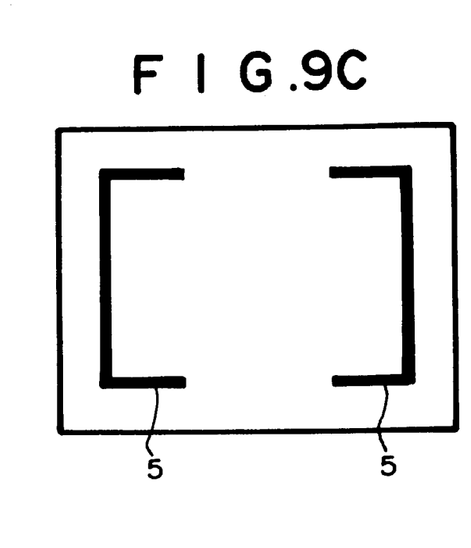

FIGS. 9A to 9C show examples of field frame display applicable to this embodiment. FIG. 9A is a partial sectional view in the case where a member acting as a field stop is disposed on the object side of the first lens $L_1$ having a negative refracting power. This field stop comprises a transparent member 2 and a frame 3 printed thereon with a pad. As an engagement portion thereof mates its corresponding part of a finder mount 1, the transparent member 2 fits in the finder mount 1. FIG. 9B is a view of the frame 3 shown in FIG. 9A as seen from the object side. As shown in FIG. 9B, the frame 3 formed on the transparent member 2 is shaped like a rectangular lining, displaying a field frame. Alternatively, the frame 3 may have a form such as that of a frame 5 shown in FIG. 9C, so as to display the field frame. Also, the method of forming the transparent member 2 with a frame is not restricted to the printing with a pad. For example, other printing methods and sealing may be used therefor.

Figure 10A:
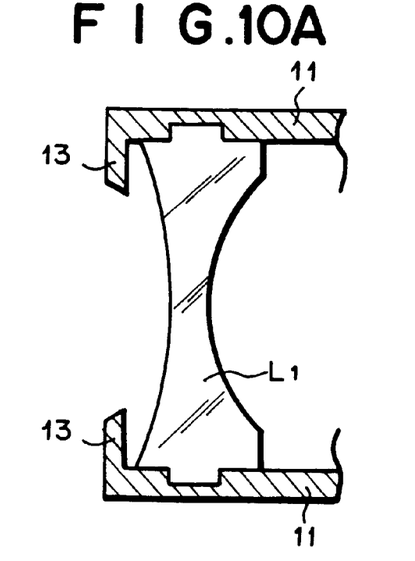
FIGS. 10A and 10B are partial sectional views showing examples of field frame display using no transparent member.
Figure 10B:
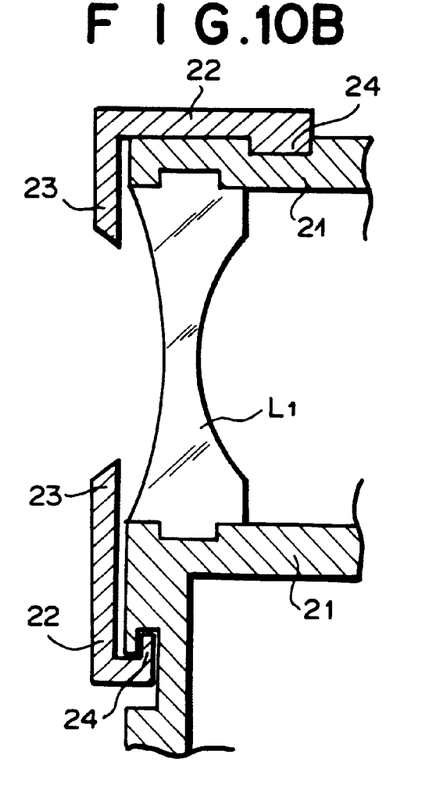

On the other hand, FIGS. 10A and 10B are partial sectional views showing configurations for displaying a field frame without disposing a transparent frame on the object side of the first lens $L_1$. FIG. 10A shows an example in which a finder mount 11 and a field stop are integrated with each other. The finder mount 11 has a frame portion 13 bent into a form substantially the same as that of the frame 3 shown in FIG. 9B when seen from the object side of the first lens $L_1$. FIG. 10B shows a configurational example in which a finder mount 21 and a field stop are separated from each other. A frame member 22 has a frame portion 23 bent into a form substantially the same as that of the frame 3 shown in FIG. 9B when seen from the object side of the first lens $L_1$. As an engagement portion 24 mates its corresponding part in the finder mount 21, the frame member 22 fits in the finder mount 21.

As such a field stop defines the field of view, a finder can be manufactured less expensively with a simpler configuration and a smaller number of members as compared with those employed in a conventional field frame display system. Also, it is unnecessary to provide a separate space for the field frame display system, whereby this configuration is also advantageous in yielding smaller dimensions.

Individual examples will now be explained in detail with reference to specific numerical values.

EXAMPLE 1

The simple power-variable finder in accordance with Example 1 is a zoom finder and, as mentioned above, has a configuration shown in FIGS. 1A and 1B. It comprises, successively from the object side, a first lens $L_1$ constituted by a negative meniscus lens having a convex surface directed onto the object side, a second lens $L_2$ constituted by a biconvex lens having a surface with a greater curvature directed onto the eye side, and a third lens $L_3$ constituted by a negative meniscus lens having a convex surface directed onto the eye side.

In this example, a field stop $M_1$ is disposed on the object side of the first lens group $G_1$, so as to define the field of view on the wide-angle side; whereas field stops $M_2$ and $M_3$ are successively disposed in this order from the object side on the object side of the second lens group $G_2$, thereby defining the field of view on the telephoto side. Here, the field stop $M_3$ is disposed near the second lens group $G_2$ on the object side thereof, and is configured so as to be movable together with the second lens group $G_2$. As the field stops $M_1$ to $M_3$ are thus disposed, the field range can be defined inexpensively with a smaller number of members.

It is desirable that the positions of the field stops $M_2$ and $M_3$ defining the field of view on the telephoto side be set near the second lens group $G_2$ on the object side or eye side, since the field-of-view marginal luminous flux in the second lens group $G_2$ is the farthest from the optical axis at the telephoto end.

As each field stop is located farther on the object side from the pupil position, the state of dispersion of luminous flux at each field stop yields less fluctuations, whereby it is relatively easy to attain an aimed diopter. Therefore, the field stop $M_1$ disposed on the object side of the first lens group $G_1$ on the wide-angle side, and the field stop $M_2$ disposed closer to the object on the telephoto side in which the second lens group $G_2$ is disposed at the farthest position from the eye are located where the aimed diopter is likely to attain, whereby the field of view can be defined effectively.

In this embodiment, while the field stop $M_3$ can define the field of view at the telephoto end together with the field stop $M_2$, it can also function as a flare stopper for cutting off the reflected light from edge portions of the second lens $L_2$ having a large edge thickness.

The upper part of Table 1(following) shows the values of radius of curvature R (mm) of each lens surface, center thickness of each lens and air space between each pair of neighboring lenses D (mm), and refractive index N and Abbe number v of each lens at d-line in this simple power-variable finder. Here, the numbers in the table successively increase from the object side, whereas the seventh surface indicates the pupil position of the eye (ditto in the subsequent tables).

In the upper part of Table 1, each of the surfaces whose R value is marked with "*" on the left side is an aspheric surface, indicating an aspheric form expressed by the following aspheric surface expression (ditto in the following tables):

$$Z = \frac{ch^2}{1 + \sqrt{1 - kc^2h^2}} + a_4h^4 + a_6h^6 + a_8h^8 + a_{10}h^{10}$$

where
Z is the length of the perpendicular to a tangential plane (plane perpendicular to the optical axis) of an apex of the aspheric surface from a point on the aspheric surface having a height h from the optical axis;
c is the reciprocal of the paraxial radius of curvature R of the aspheric surface;
h is the height from the optical axis;
k is the eccentricity; and
$a_4$, $a_6$, $a_8$, and $a_{10}$ are the fourth-, sixth-, eighth-, and tenth-order aspheric surface coefficients.

The middle part of Table 1 shows the values of constants c, k, $a_4$, $a_6$, $a_8$, and $a_{10}$ of the aspheric surfaces shown in the above-mentioned aspheric surface expression.

The lower part of Table 1 shows the values of finder magnification Γ, diopter dp, angle of view 2ω, distances $D_2$, $D_4$ between the individual lens groups $G_1$, $G_2$, $G_3$ at each of positions of wide-angle end, intermediate value, and telephoto end; and the values of conditional expressions (1) to (3).

Figure 2A:
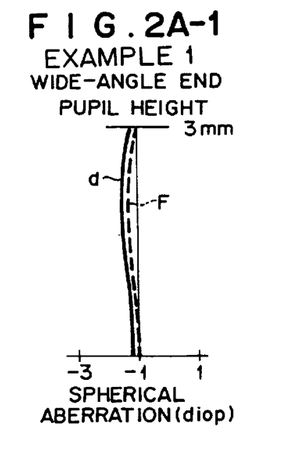
Figure 2A:
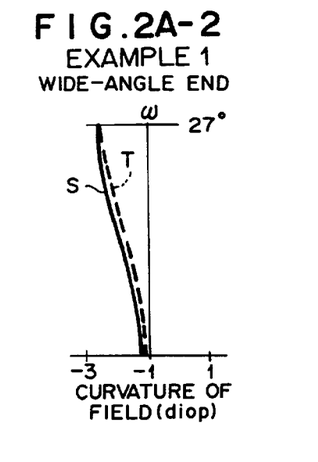
Figure 2A:
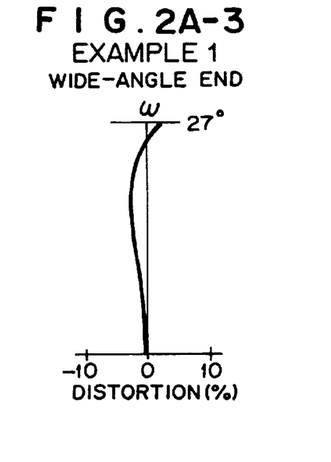
Figure 2B:
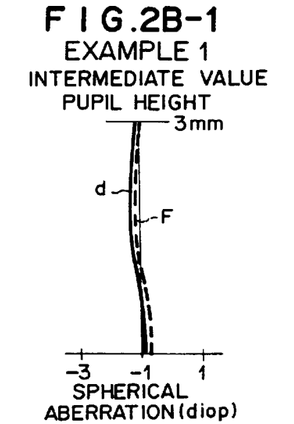
Figure 2B:
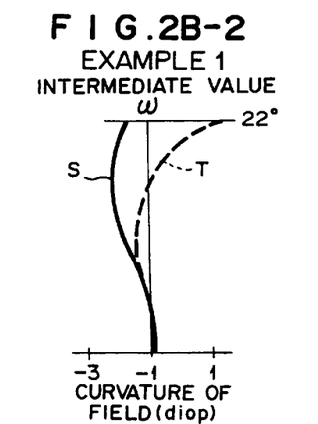
Figure 2B:
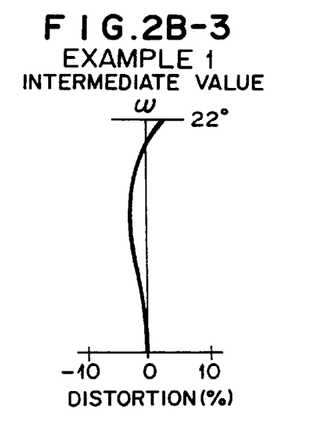
Figure 2C:
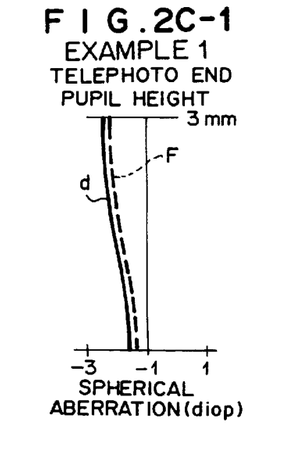
Figure 2C:
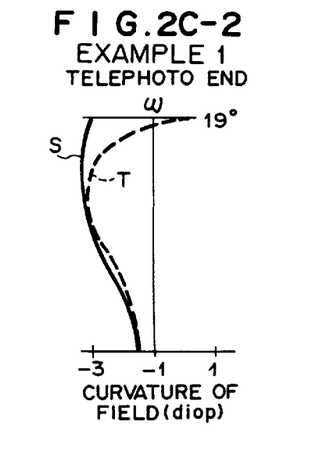
Figure 2C:
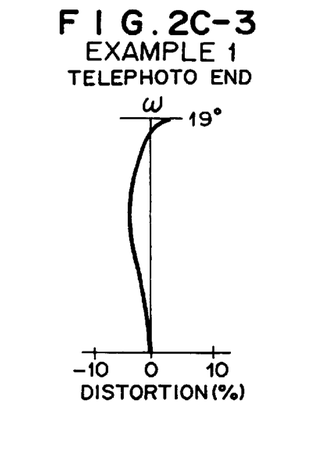

Each of FIGS. 2A to 2C is a chart showing spherical aberration, curvature of field, and distortion of the simple power-variable finder in Example 1. In these aberration charts, ω indicates the half angle of view. In each spherical aberration chart, solid line d and broken line F indicate respective spherical aberrations at d-line and F-line. In each chart for curvature of field, solid line S and dotted line T indicate respective curvatures of field in the sagittal and tangential image surfaces.

As shown in the lower part of Table 1 and FIGS. 2A to 2C, the simple power-variable finder in accordance with Example 1 clearly satisfies all of the above-mentioned conditional expressions (1) to (3) and favorably corrects aberrations.

EXAMPLE 2

Figure 3A:
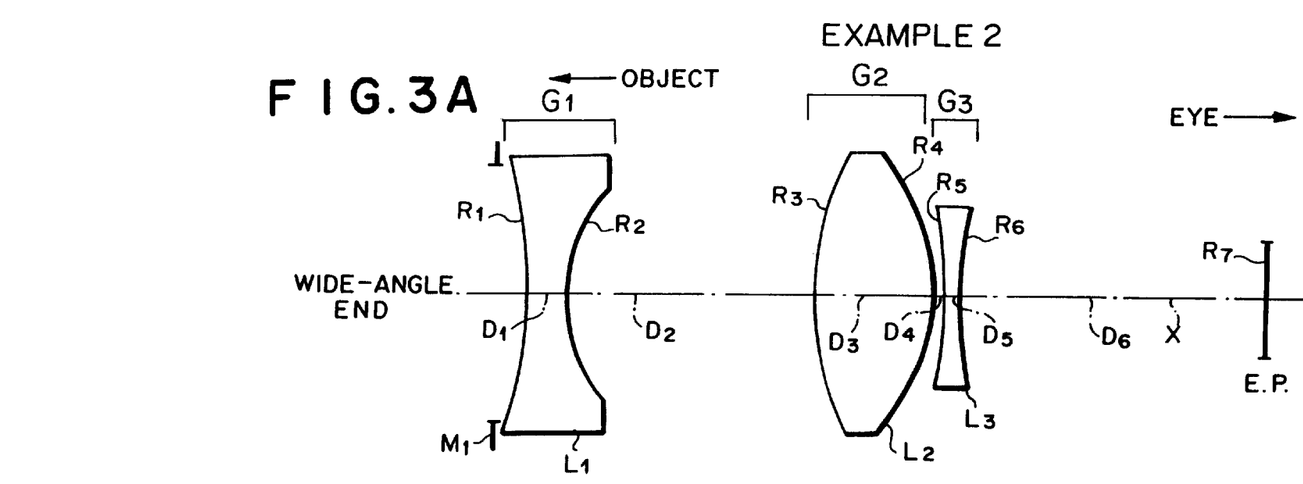
FIGS. 3A and 3B are schematic views showing a basic configuration of the simple power-variable finder in accordance with Example 2 of the present invention.
Figure 3B:
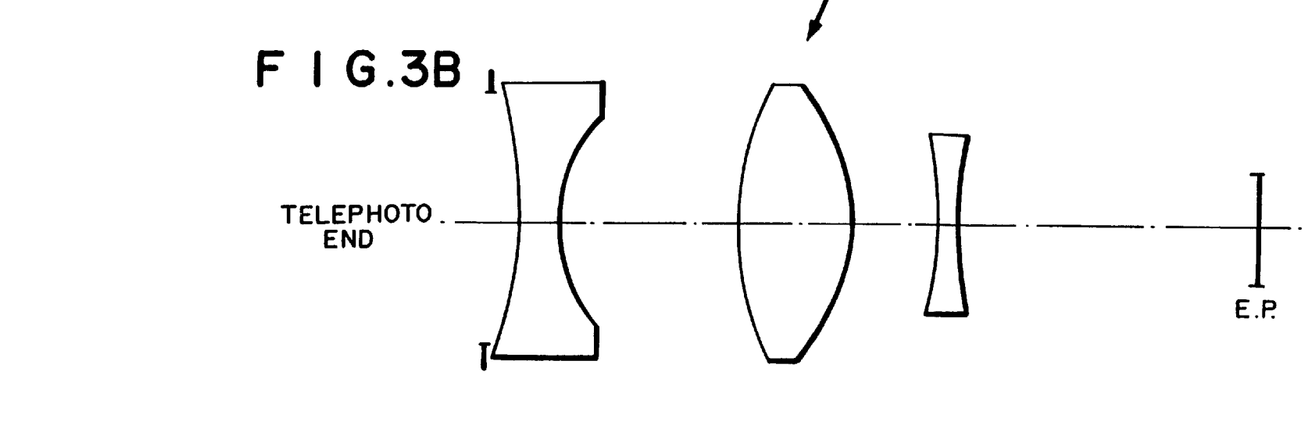

The simple power-variable finder in accordance with Example 2 is a bifocal simple T/W switchable finder which is used only at both of the telephoto end (T) and wide-angle end (W), and is configured as shown in FIGS. 3A and 3B.

This simple power-variable finder comprises, successively from the object side, a first lens $L_1$ constituted by a biconcave lens having a surface with a greater curvature directed onto the eye side, a second lens $L_2$ constituted by a biconvex lens having a surface with a greater curvature directed onto the eye side, and a third lens $L_3$ constituted by a biconcave lens having a surface with a greater curvature directed onto the object side, whereas a field stop $M_1$ is disposed near the first lens $L_1$ on the object side.

It differs from Example 1 in that the field stop is located at only one position, which will now be explained.

When the finder magnification range and the refracting power distribution of the individual lens groups $G_1$ to $G_3$ are appropriately selected as shown in Example 2, the effective diameter of the first lens group $G_1$ on the wide-angle side and that on the telephoto side become substantially identical to each other, whereby the field stop $M_1$ can be shared on the wide-angle side and telephoto side. Therefore, the field range can be defined by a simpler configuration, and the finder can be made less expensively. As explained in the embodiment, the aimed diopter of a field stop is more likely to be obtained when the field stop is located farther on the object side from the pupil position, whereby effects of the field range being definable by the field stop $M_1$ at a single position are high.

Also, according to the lens configuration of this example, since the object-side surface of the first lens $L_1$ is concave onto the object side, a finder with a compact configuration can be attained when a transparent member for displaying a field frame, such as the one mentioned above, is disposed on the object side of the first lens $L_1$.

The upper part of Table 2(following) shows the values of radius of curvature R (mm) of each lens surface, center thickness of each lens and air space between each pair of neighboring lenses D (mm), and refractive index N and Abbe number v of each lens at d-line in this simple power-variable finder.

The middle part of Table 2 shows the values of constants c, k, $a_4$, $a_6$, $a_8$, and $a_{10}$ of the aspheric surfaces shown in the above-mentioned aspheric surface expression.

Further, the lower part of Table 2 shows the values of finder magnification Γ, diopter dp, angle of view 2ω, distances $D_2$, $D_4$ between the individual lens groups $G_1$, $G_2$, $G_3$ at each of positions of wide-angle end and telephoto end; and the values of conditional expressions (1) to (3).

Figure 4A:
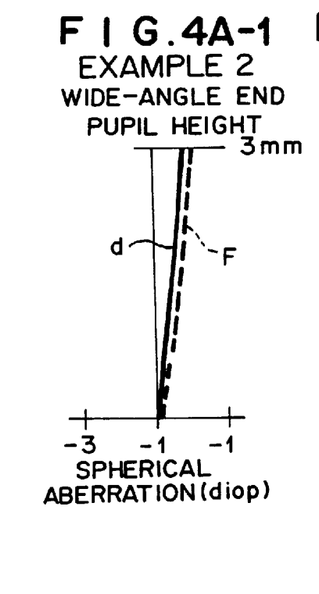
Figure 4A:
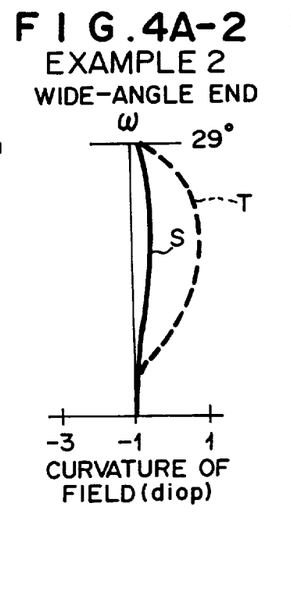
Figure 4A:
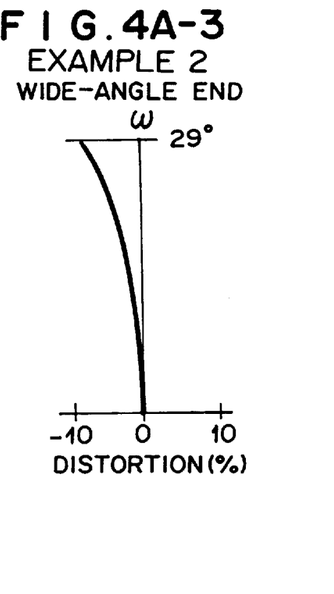
Figure 4B:
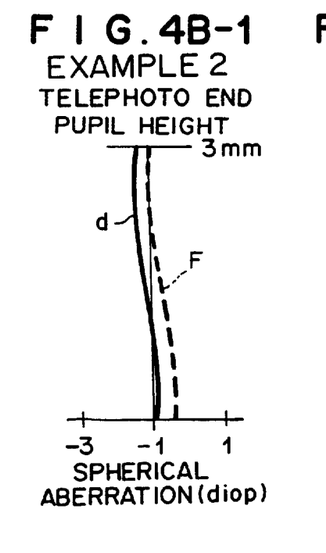
Figure 4B:
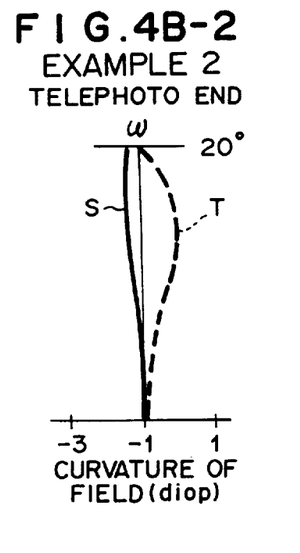
Figure 4B:
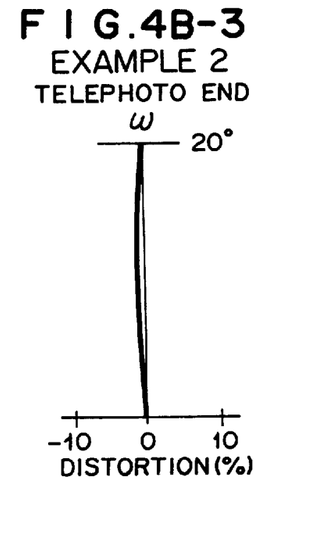

Each of FIGS. 4A and 4B is a chart showing spherical aberration, curvature of field, and distortion of the simple power-variable finder in Example 2. In these aberration charts, ω indicates the half angle of view. In each spherical aberration chart, solid line d and broken line F indicate respective spherical aberrations at d-line and F-line. In each chart for curvature of field, solid line S and dotted line T indicate respective curvatures of field in the sagittal and tangential image surfaces.

As shown in the lower part of Table 2 and FIGS. 4A and 4B, the simple power-variable finder in accordance with Example 2 clearly satisfies all of the above-mentioned conditional expressions (1) to (3) and favorably corrects aberrations.

EXAMPLE 3

Figure 5A:
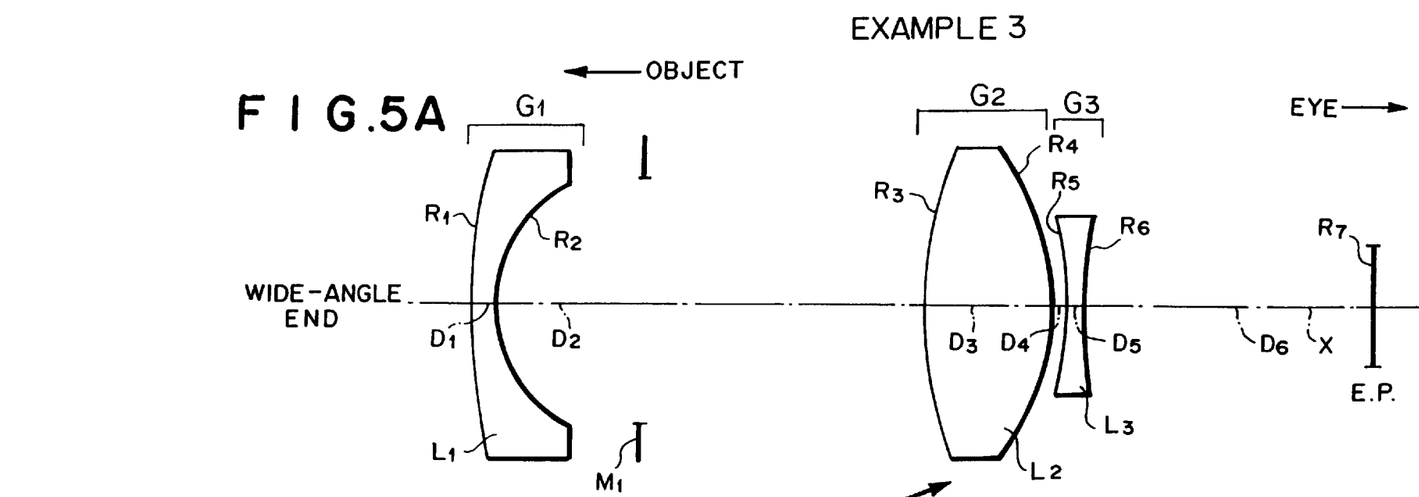
FIGS. 5A and 5B are schematic views showing a basic configuration of the simple power-variable finder in accordance with Example 3 of the present invention.
Figure 5B:
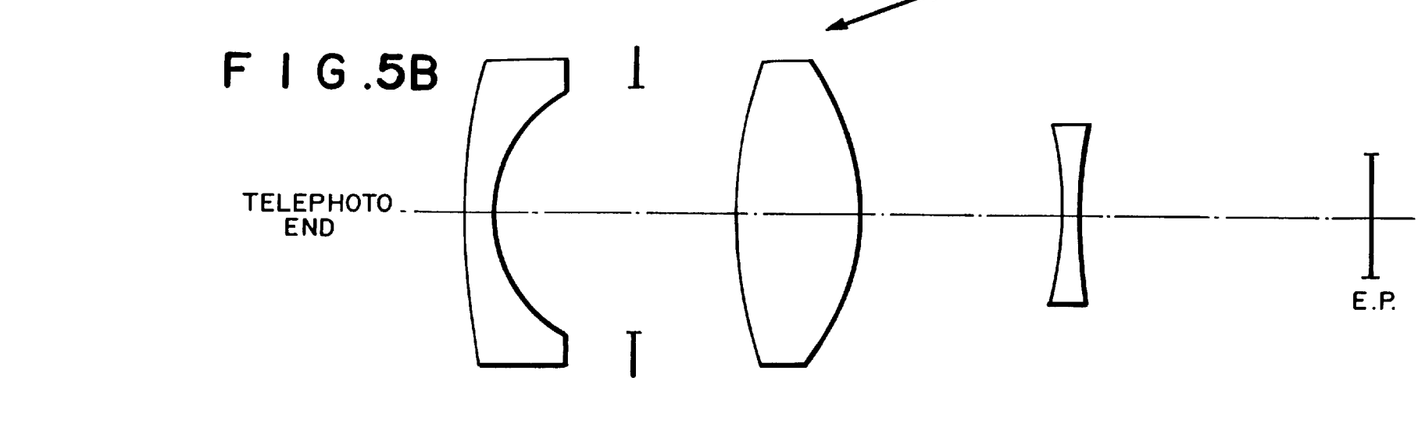

The simple power-variable finder in accordance with Example 3 is a bifocal simple T/W switchable finder which is used only at both of the telephoto end (T) and wide-angle end (W), and is configured as shown in FIGS. 5A and 5B.

This simple power-variable finder comprises, successively from the object side, a first lens $L_1$ constituted by a negative meniscus lens having a convex surface directed onto the object side, a second lens $L_2$ constituted by a biconvex lens having a surface with a greater curvature directed onto the eye side, and a third lens $L_3$ constituted by a biconcave lens having a surface with a greater curvature directed onto the object side, whereas a field stop $M_1$ is disposed near the first lens $L_1$ on the eye side.

In this embodiment, the field stop $M_1$ is disposed on the eye side of the first lens $L_1$. Therefore, the first lens group $G_1$ has substantially the same effective diameter on the wide-angle side and telephoto side, whereby the field stop $M_1$ can be shared on the wide-angle side and telephoto side. As a consequence, the field range can be defined by a simpler configuration, and the finder can be made less expensively.

The upper part of Table 3(following) shows the values of radius of curvature R (mm) of each lens surface, center thickness of each lens and air space between each pair of neighboring lenses D (mm), and refractive index N and Abbe number v of each lens at d-line in this simple power-variable finder.

The middle part of Table 3 shows the values of constants c, k, $a_4$, $a_6$, $a_8$, and $a_{10}$ of the aspheric surfaces shown in the above-mentioned aspheric surface expression.

The lower part of Table 3 shows the values of finder magnification Γ, diopter dp, angle of view 2ω, distances $D_2$, $D_4$ between the individual lens groups $G_1$, $G_2$, $G_3$ at each of positions of wide-angle end and telephoto end; and the values of conditional expressions (1) to (3).

Figure 6A:
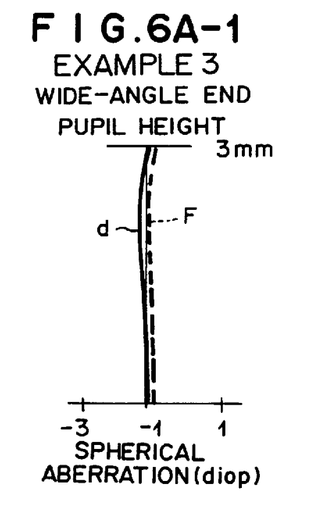
Figure 6A:
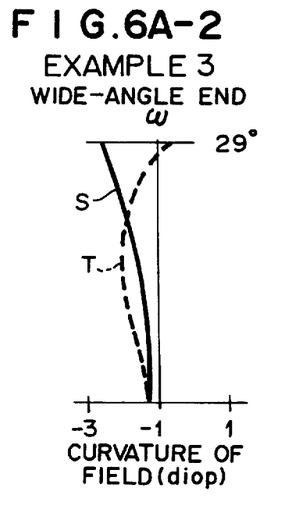
Figure 6A:
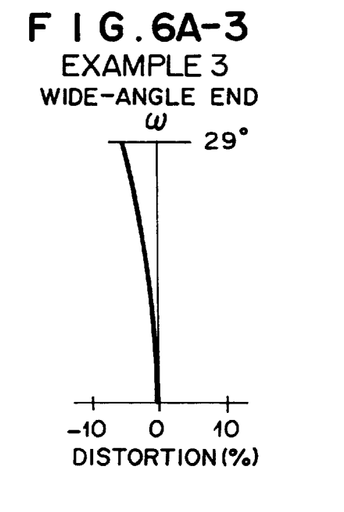
Figure 6B:
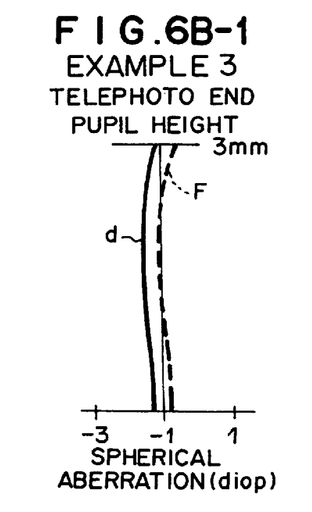
Figure 6B:
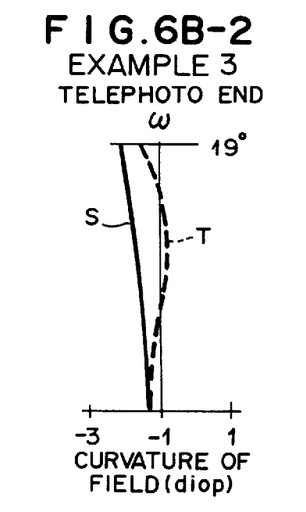
Figure 6B:
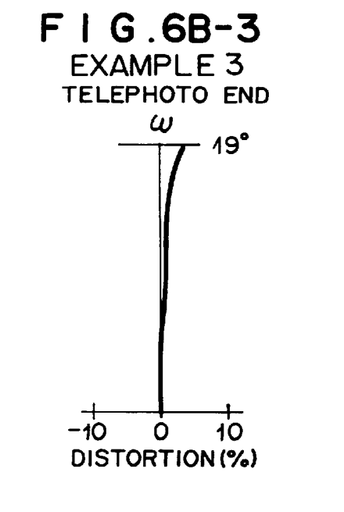

Each of FIGS. 6A and 6B is a chart showing spherical aberration, curvature of field, and distortion of the simple power-variable finder in Example 3. In these aberration charts, ω indicates the half angle of view. In each spherical aberration chart, solid line d and broken line F indicate respective spherical aberrations at d-line and F-line. In each chart for curvature of field, solid line S and dotted line T indicate respective curvatures of field in the sagittal and tangential image surfaces.

As shown in the lower part of Table 3 and FIGS. 6A and 6B, the simple power-variable finder in accordance with Example 3 clearly satisfies all of the above-mentioned conditional expressions (1) to (3) and favorably corrects aberrations.

EXAMPLE 4

Figure 7A:
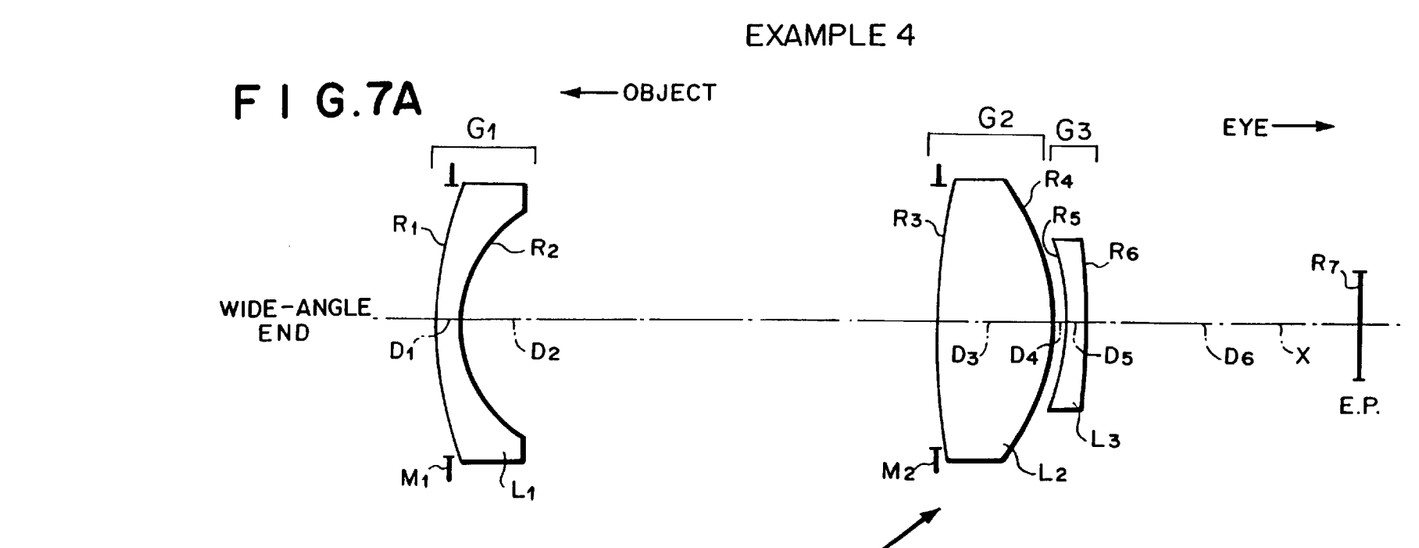
FIGS. 7A and 7B are schematic views showing a basic configuration of the simple power-variable finder in accordance with Example 4 of the present invention.
Figure 7B:
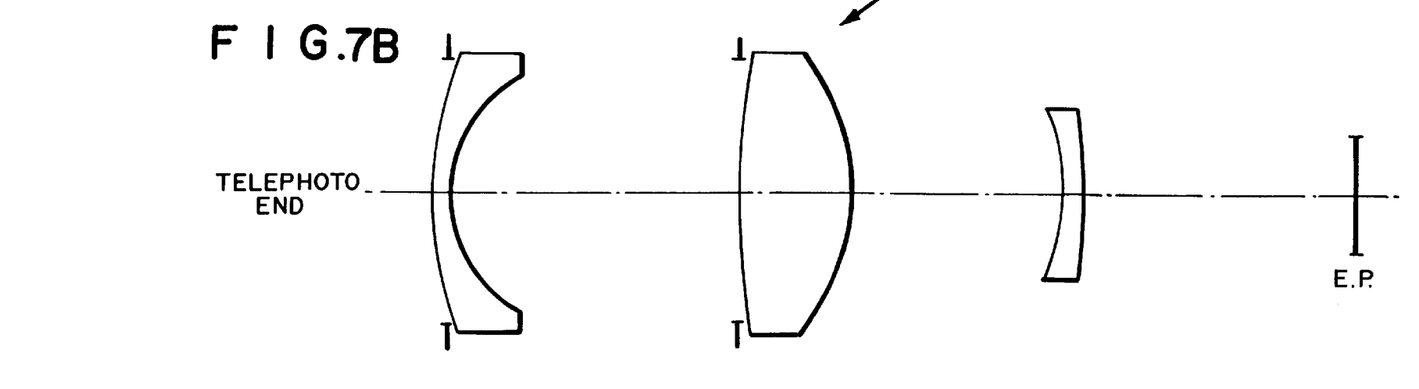

The simple power-variable finder in accordance with Example 4 is a zoom finder and has a configuration shown in FIGS. 7A and 7B.

This simple power-variable finder comprises, successively from the object side, a first lens $L_1$ constituted by a negative meniscus lens having a convex surface directed onto the object side, a second lens $L_2$ constituted by a biconvex lens having a surface with a greater curvature directed onto the eye side, and a third lens $L_3$ constituted by a biconcave lens having a surface with a greater curvature directed onto the object side; whereas a field stop $M_1$ is disposed on the eye side of the first lens $L_1$, and a field stop $M_2$ is disposed on the object side of the second lens $L_2$.

In this example, the field stop $M_1$ is disposed on the object side of the first lens group $G_1$, so as to define the field of view on the wide-angle side. On the other hand, the field stop $M_2$ is disposed on the object side of the second lens group $G_2$ and movable together with the second lens group $G_2$, thereby defining the field of view on the telephoto side. Here, as explained in Example 1, the field stops $M_1$, $M_2$ are relatively more likely to attain the aimed diopter when located farther on the object side from the pupil position. Therefore, each of the field stops $M_1$, $M_2$ is located at a position where the aimed diopter is likely to be attained.

The upper part of Table 4(following) shows the values of radius of curvature R (mm) of each lens surface, center thickness of each lens and air space between each pair of neighboring lenses D (mm), and refractive index N and Abbe number v of each lens at d-line in this simple power-variable finder.

The middle part of Table 4 shows the values of constants c, k, $a_4$, $a_6$, $a_8$, and $a_{10}$ of the aspheric surfaces shown in the above-mentioned aspheric surface expression.

The lower part of Table 4 shows the values of finder magnification Γ, diopter dp, angle of view 2ω, distances $D_2$, $D_4$ between the individual lens groups $G_1$, $G_2$, $G_3$ at positions of wide-angle end, intermediate value, and telephoto end; and the values of conditional expressions (1) to (3).

Figure 8A:
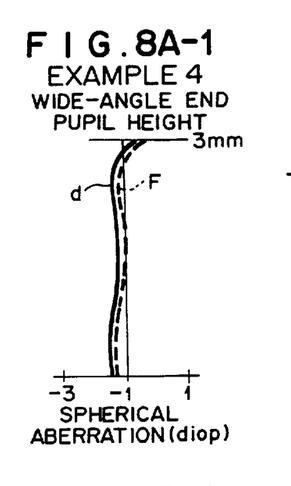
Figure 8A:
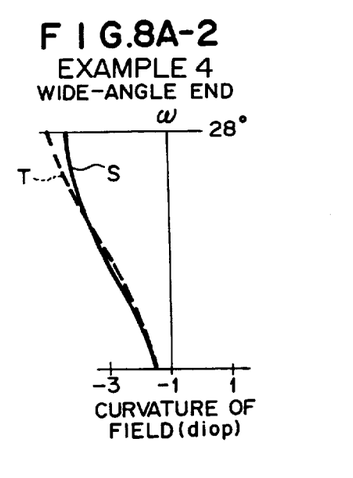
Figure 8A:
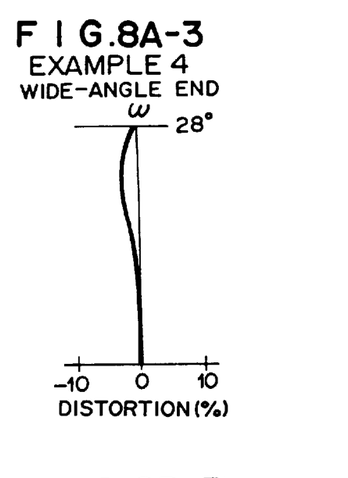
Figure 8B:
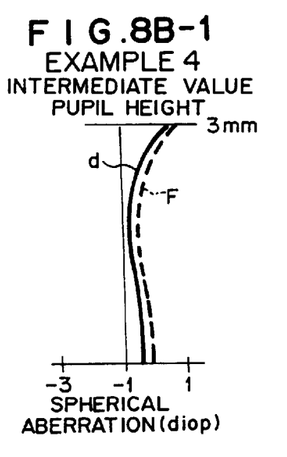
Figure 8B:
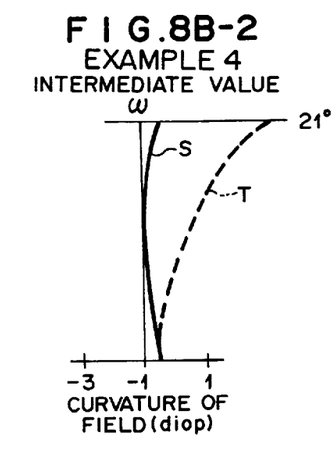
Figure 8B:
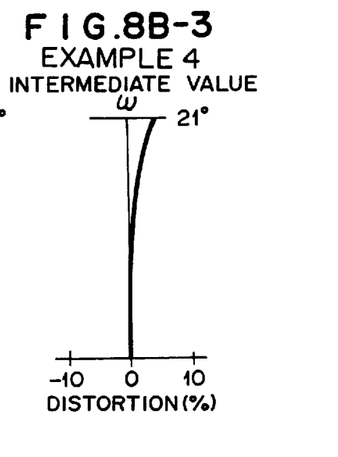
Figure 8C:
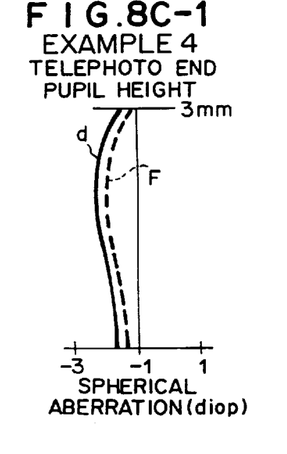
Figure 8C:
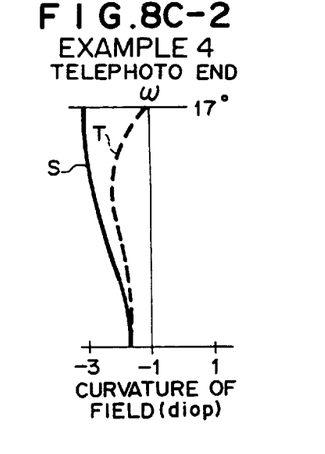
Figure 8C:
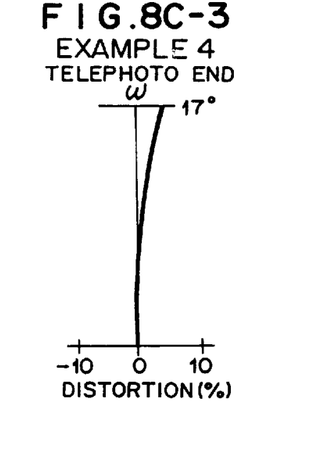

Each of FIGS. 8A to 8C is a chart showing spherical aberration, curvature of field, and distortion of the simple power-variable finder in Example 4. In these aberration charts, ω indicates the half angle of view. In each spherical aberration chart, solid line d and broken line F indicate respective spherical aberrations at d-line and F-line. In each chart for curvature of field, solid line S and dotted line T indicate respective curvatures of field in the sagittal and tangential image surfaces.

As shown in the lower part of Table 4 and FIGS. 8A to 8C, the simple power-variable finder in accordance with Example 4 clearly satisfies all of the above-mentioned conditional expressions (1) to (3) and favorably corrects aberrations.

Without being restricted to those of the foregoing examples, the simple power-variable finder of the present invention can be modified in various manners. For example, the radius of curvature R and lens space (or lens thickness) D of each lens can be modified as appropriate.

Though the second lens group is constituted by a single biconvex lens in the above-mentioned embodiment, without being restricted thereto, it may be constituted by a plurality of positive lenses as well.

Also, the field stop $M_2$ defining the field range at the telephoto end may be located on the object side of the second lens group $G_2$.

As explained in the foregoing, the simple power-variable finder in accordance with the present invention comprises, successively from the object side, a first lens group having a negative refracting power, a second lens group, movable on the optical axis, having a positive refracting power, and a third lens group having a negative refracting power, and satisfies predetermined conditional expressions, whereby it is possible to obtain a small-size, inexpensive, simple power-variable finder suitable for low-cost cameras.

TABLE 1

| Surface | R | D | $N_d$ | $v_d$ |
|---|---|---|---|---|
| 1 | 17.190 | 1.200 | 1.49023 | 57.6 |
| 2* | 6.534 | $D_2$(variable) | 1.00000 | |
| 3 | 76.200 | 6.000 | 1.49023 | 57.6 |
| 4* | −15.072 | $D_4$(variable) | 1.00000 | |
| 5* | −23.492 | 1.000 | 1.49023 | 57.6 |
| 6 | 244.963 | 15.000 | 1.00000 | |
| 7 | pupil | | | |

| Surface | c | k | $a_4$ | $a_6$ | $a_8$ | $a_{10}$ |
|---|---|---|---|---|---|---|
| 2 | 0.1530456 | 0.552871 | $2.8093 \times 10^{-4}$ | $-1.5649 \times 10^{-5}$ | $3.2860 \times 10^{-7}$ | $-2.6800 \times 10^{-9}$ |
| 4 | −0.0663482 | 1.523188 | $6.9545 \times 10^{-5}$ | $-3.8021 \times 10^{-7}$ | $4.9146 \times 10^{-9}$ | $-6.5106 \times 10^{-12}$ |
| 5 | −0.0425677 | −7.445749 | $-1.8854 \times 10^{-4}$ | $2.3858 \times 10^{-5}$ | $-1.4844 \times 10^{-6}$ | $3.0326 \times 10^{-8}$ |

| Item | Symbol | Wide-angle end | Intermediate value | Telephoto end |
|---|---|---|---|---|
| Finder magnification | Γ | 0.401 | 0.504 | 0.603 |
| Diopter | dp | −1.234 diop | −0.824 diop | −1.475 diop |
| Angle of view | 2 ω | 54.0° | 44.0° | 37.7° |

TABLE 1-continued

| | | | | |
|---|---|---|---|---|
| $1^{st}$–$2^{nd}$ group distance | $D_2$ | 32.542 | 26.638 | 21.747 |
| $2^{nd}$–$3^{rd}$ group distance | $D_4$ | 1.096 | 7.000 | 11.891 |
| Expression(1) | $f_2/f_1$ | −1.175 | | |
| Expression(2) | $f_3/f_1$ | 1.956 | | |
| Expression(3) | $D_T/f_1$ | −1.874 | | |

TABLE 2

| Surface | R | D | $N_d$ | $v_d$ |
|---|---|---|---|---|
| 1 | −89.577 | 2.000 | 1.49023 | 57.6 |
| 2* | 5.768 | $D_2$(variable) | 1.00000 | |
| 3 | 15.065 | 6.000 | 1.49023 | 57.6 |
| 4* | −8.660 | $D_4$(variable) | 1.00000 | |
| 5* | −17.063 | 1.000 | 1.49023 | 57.6 |
| 6 | 22.996 | 15.000 | 1.00000 | |
| 7 | pupil | | | |

| Surface | c | k | $a_4$ | $a_6$ | $a_8$ | $a_{10}$ |
|---|---|---|---|---|---|---|
| 2 | 0.1733703 | 0.275282 | $4.8651 \times 10^{-4}$ | $-2.8571 \times 10^{-5}$ | $1.9495 \times 10^{-6}$ | $-3.4853 \times 10^{-8}$ |
| 4 | −0.1154734 | −0.068956 | $1.4627 \times 10^{-4}$ | $-3.6569 \times 10^{-6}$ | $5.7491 \times 10^{-8}$ | $-2.9126 \times 10^{-10}$ |
| 5 | −0.0586063 | 0.623726 | $2.2629 \times 10^{-4}$ | $-1.3184 \times 10^{-5}$ | $1.6826 \times 10^{-7}$ | 0.0 |

| Item | Symbol | Wide-angle end | Telephoto end |
|---|---|---|---|
| Finder magnification | Γ | 0.465 | 0.628 |
| Diopter | dp | −0.988 diop | −0.889 diop |
| Angle of view | 2ω | 57.7° | 40.8° |
| $1^{st}$–$2^{nd}$ group distance | $D_2$ | 12.683 | 8.978 |
| $2^{nd}$–$3^{rd}$ group distance | $D_4$ | 0.600 | 4.305 |
| Expression(1) | $f_2/f_1$ | −1.114 | |
| Expression(2) | $f_3/f_1$ | 1.805 | |
| Expression(3) | $D_T/f_1$ | −2.029 | |

40

TABLE 3

| Surface | R | D | $N_d$ | $v_d$ |
|---|---|---|---|---|
| 1 | 36.277 | 1.200 | 1.49023 | 57.6 |
| 2* | 5.773 | $D_2$(variable) | 1.00000 | |
| 3 | 20.928 | 6.500 | 1.49023 | 57.6 |
| 4* | −12.226 | $D_4$variable) | 1.00000 | |
| 5* | −19.644 | 1.000 | 1.49023 | 57.6 |
| 6 | 37.641 | 15.000 | 1.00000 | |
| 7 | pupil | | | |

| Surface | c | k | $a_4$ | $a_6$ | $a_8$ | $a_{10}$ |
|---|---|---|---|---|---|---|
| 2 | 0.1732202 | 0.561670 | $-2.3946 \times 10^{-6}$ | $-3.5215 \times 10^{-6}$ | $2.4875 \times 10^{-7}$ | $-5.5338 \times 10^{-9}$ |
| 4 | −0.0817929 | 0.450424 | $5.9016 \times 10^{-5}$ | $-1.3415 \times 10^{-6}$ | $2.5966 \times 10^{-8}$ | $-1.5907 \times 10^{-10}$ |
| 5 | −0.0509061 | −7.445749 | $-1.3220 \times 10^{-4}$ | $4.2543 \times 10^{-6}$ | $-4.9102 \times 10^{-7}$ | $1.5630 \times 10^{-8}$ |

| Item | Symbol | Wide-angle end | Telephoto end |
|---|---|---|---|
| Finder magnification | Γ | 0.398 | 0.694 |
| Diopter | dp | −1.203 diop | −1.281 diop |
| Angle of view | 2ω | 57.8° | 37.8° |
| $1^{st}$–$2^{nd}$ group distance | $D_2$ | 22.037 | 12.535 |
| $2^{nd}$–$3^{rd}$ group distance | $D_4$ | 0.596 | 10.098 |

TABLE 3-continued

| | | |
|---|---|---|
| Expression(1) | $f_2/f_1$ | −1.186 |
| Expression(2) | $f_3/f_1$ | 1.845 |
| Expression(3) | $D_T/f_1$ | −2.208 |

TABLE 4

| Surface | R | D | $N_d$ | $\nu_d$ |
|---|---|---|---|---|
| 1 | 18.441 | 1.200 | 1.49023 | 57.6 |
| 2* | 5.844 | $D_2$(variable) | 1.00000 | |
| 3 | 42.598 | 6.000 | 1.49023 | 57.6 |
| 4* | −12.570 | $D_4$(variable) | 1.00000 | |
| 5* | −10.376 | 1.000 | 1.49023 | 57.6 |
| 6 | 69.250 | 15.000 | 1.00000 | |
| 7 | pupil | | | |

| Surface | c | k | $a_4$ | $a_6$ | $a_8$ | $a_{10}$ |
|---|---|---|---|---|---|---|
| 2 | 0.1711157 | 0.453381 | $1.3696 \times 10^{-4}$ | $-1.2368 \times 10^{-5}$ | $4.8287 \times 10^{-7}$ | $-5.3912 \times 10^{-9}$ |
| 4 | −0.0795545 | 0.645838 | $2.8271 \times 10^{-5}$ | $1.8727 \times 10^{-7}$ | $-7.3413 \times 10^{-9}$ | $5.4773 \times 10^{-11}$ |
| 5 | −0.0963763 | −7.445749 | $-1.0612 \times 10^{-3}$ | $8.8225 \times 10^{-5}$ | $-5.5581 \times 10^{-6}$ | $1.3309 \times 10^{-7}$ |

| Item | Symbol | Wide-angle end | Intermediate value | Telephoto end |
|---|---|---|---|---|
| Finder magnification | Γ | 0.397 | 0.531 | 0.662 |
| Diopter | dp | −1.456 diop | −0.458 diop | −1.688 diop |
| Angle of view | 2ω | 55.8° | 41.3° | 33.6° |
| 1st–2nd group distance | $D_2$ | 25.937 | 20.033 | 15.280 |
| 2nd–3rd group distance | $D_4$ | 0.596 | 6.500 | 11.253 |
| Expression(1) | $f_2/f_1$ | −1.139 | | |
| Expression(2) | $f_3/f_1$ | 1.867 | | |
| Expression(3) | $D_T/f_1$ | −1.927 | | |

What is claimed is:

1. A power-variable finder comprising, successively from an object side, a first lens group having a negative refracting power, a second lens group, movable on an optical axis, having a positive refracting power, and a third lens group having a negative refracting power; said finder satisfying the following conditional expressions (1) to (3):

$$-1.3 < f_2/f_1 < -1.0 \quad (1)$$

$$1.6 < f_3/f_1 < 2.2 \quad (2)$$

$$-2.4 < D_T/f_1 < -1.7 \quad (3)$$

where $f_1$ is the focal length of the first lens group;

$f_2$ is the focal length of the second lens group;

$f_3$ is the focal length of the third lens group; and $D_T$ is the distance on the optical axis between the surface closest to the object in the first lens group and the surface closest to an eye in the third lens group, and wherein said first lens group consists of a single negative lens having at least one aspheric surface and having a concave surface directed onto the eye side, said second lens group consists of a single biconvex lens having at least one aspheric surface, and said third lens group consists of a single negative lens.

2. A power-variable finder according to claim 1, further comprising a first field stop disposed in front of or behind said first lens group.

3. A power-variable finder according to claim 1, further comprising at least two field stops including a first field stop disposed in front of or behind said first lens group and a second field stop disposed in front of or behind said second lens group.

4. A power-variable finder according to claim 1, wherein the negative lens consists of said first lens group, the biconvex lens consists of said second lens group, and the negative lens consists of said third lens group are made of the same material.

5. A power-variable finder according to claim 2, wherein said first field stop is functional as a finder field frame and is disposed in front of said first lens group.

6. A power-variable finder according to claim 3, wherein said first field stop is functional as a finder field frame and is disposed in front of said first lens group.

7. A power-variable finder according to claim 2, wherein said first field stop is made of a transparent member and is disposed in front of said first lens group, said transparent member being formed with a frame functional as a finder field frame.

8. A power-variable finder according to claim 3, wherein said first field stop is made of a transparent member and is disposed in front of said first lens group, said transparent member being formed with a frame functional as a finder field frame.

9. A power-variable finer according to claim 7, wherein the surface closest to the object in said first lens group is made concave onto the object side.

10. A power-variable finer according to claim 8, wherein the surface closest to the object in said first lens group is made concave onto the object side.

* * * * *

UNITED STATES PATENT AND TRADEMARK OFFICE
CERTIFICATE OF CORRECTION

PATENT NO.    : 6,310,732 B1
DATED         : October 30, 2001
INVENTOR(S)   : Kazunori Ohno It is certified that error appears in the above-identified patent and that said Letters Patent is hereby corrected as shown below:

<u>Column 14,</u>
Line 60, delete "finer" and substitute therefore -- finder --.
Line 63, delete "finer" and substitute therefore -- finder --.

Signed and Sealed this

Eleventh Day of June, 2002

Attest:

Attesting Officer

JAMES E. ROGAN
*Director of the United States Patent and Trademark Office*